April 17, 1956 C. STAMBAUGH 2,742,101
CLEAN-EASY DRAIN TRAP
Filed July 16, 1952

INVENTOR
CLYDE STAMBAUGH

BY *Gustave Miller*
ATTORNEY

United States Patent Office 2,742,101
Patented Apr. 17, 1956

2,742,101
CLEAN-EASY DRAIN TRAP

Clyde Stambaugh, Algonac, Mich., assignor to Gustave Miller, Washington, D. C.

Application July 16, 1952, Serial No. 299,188

1 Claim. (Cl. 182—7)

This invention relates to clean-easy drain traps and particularly relates to drain traps for use with sinks and lavatory drains and the like.

The drain traps now in general use usually comprise a closed chamber which is permanently connected to the drain pipe system. If sediment or other refuse clogs this trap it can only be cleaned by the use of a probe or other inadequate means which are not capable of fully cleaning out the trap.

It is, therefore, one object of this invention to provide a drain trap which is capable of being quickly and easily cleaned.

Another object of this invention is to provide a clean-easy drain trap which is fully sealed against leakage.

Another object of this invention is to provide a clean-easy drain trap having relatively few parts.

Other objects of this invention are to provide an improved device of the character described, that is easily and economically produced, which is sturdy in construction, and which is highly effective in operation.

With the above and related objects in view, this invention consists in the details of construction and combination of parts, as will be more fully understood from the following description, when read in conjunction with the accompanying drawing in which.

Figure 1:
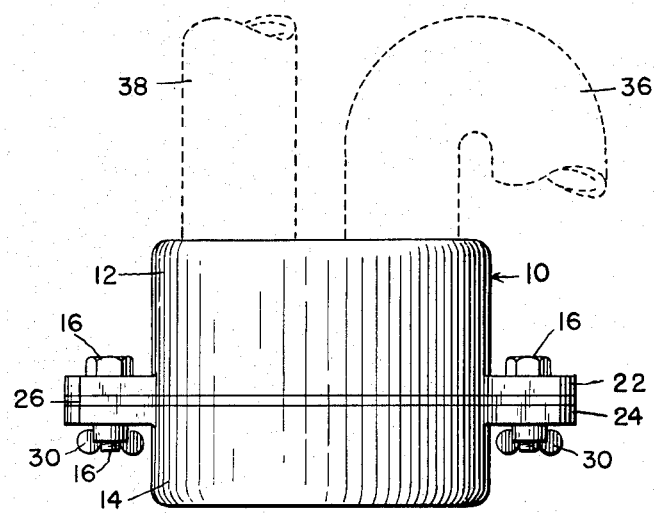
Fig. 1 is an elevational view of the clean-easy drain trap of this invention.

Referring now in greater detail to the drawing wherein similar reference characters refer to similar parts, there is shown a clean-easy drain trap 10 comprising a top portion 12 and a bottom portion 14. The two portions are separable from each other but are adapted to be connected by means of bolts 16 which are adapted to be inserted through openings 18 and through openings 20 which coincide with openings 18. The openings 18 are provided in a pair of flanges 22 in the upper portion 12 and the openings 20 are provided in a pair of flanges 24 in the lower portion 14. A sealing ring 26, of rubber or the like, having flanges similar to flanges 22 and 24, fits between the flanges 22 and 24. These flanges on the sealing ring 26 are provided with openings coinciding with openings 18 and 20. When the bolts 16 are inserted through the openings 18 and 20, butterfly nuts 30 are used to tighten the bolts in place. The tightening of the bolts not only firmly connects the portions 12 and 14 but also asserts a pressure on the sealing ring 26 to form a tight fluid seal preventing the egress of any water, sediment or other material held within the clean-easy drain trap.

A pair of threaded openings 32 and 34 are provided in the top wall of the upper portion 12 to receive therein the threaded end portions of the pipes 38 and 36, respectively, one of which leads from a sink, lavatory or the like, and the other of which leads to the drainage system.

Figure 3:
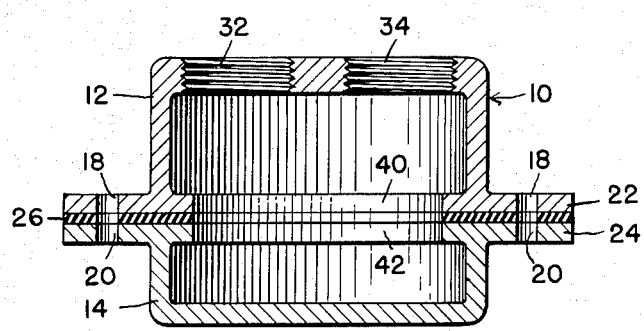
Fig. 3 is a sectional view taken on line 3—3 of Fig. 2.
Figure 2:
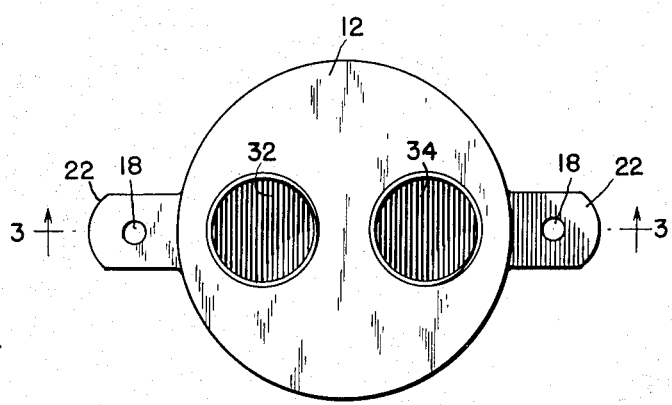
Fig. 2 is a top plan view of the device shown in Fig. 1.

The lower wall of the upper portion 12 has a wide opening 40 therein which coincides with a similar opening 42 in the upper wall of the lower portion 14 to provide what is substantially a single chamber in the whole drain trap 10. As will be observed from Fig. 3, the cross sectional area of the drain trap is considerably greater than the cross sectional area of the drain pipe apertures 32 and 34 or of the drain system pipes 38 and 36, as a result of which, fluid flowing from the entrance pipe 38 is considerably slowed up as it passes through the drain trap, and hence, tends to drop or release its sediment as the fluid flows slowly through the drain trap. In addition, the internally extending flanges in which the openings 40 and 42 between the upper and lower sections are located, provide a baffle tending to trap and hold the sediment from the slowly moving fluid therethrough and catch it in the bottom portion 14, in which it tends to collect and remain undisturbed by the fluid flowing from the entrance opening 32 to the discharge opening 34. As a result, the efficiency of this trap is considerably greater than that of the conventional trap wherein there is in effect merely a continuous passage of uniform area.

In operation, when enough sediment collects in the clean-easy drain trap, the bottom portion 14 is removed from the upper portion 12 which remains attached to the pipes 36 and 38. This is done by removing the bolts 16 and the sealing ring 26. The upper and lower portions are then cleaned out and the lower portion is again connected to the upper portion, after which the drain trap is ready for use again.

Although this invention has been described in considerable detail, such description is intended as being illustrative rather than limiting, since the invention may be variously embodied, and the scope of the invention is to be determined as claimed.

What is claimed as the invention is:

A drain trap and sediment chamber comprised of superposed upper and lower sections, said lower section having a closed bottom wall and said upper circular section having a closed top wall, a pair of threaded drain receiving apertures in said top wall, said apertures each being of a diameter materially less than in the diameter of said top wall, and spaced apart whereby the combined cross sectional area of the pipes is substantially less than the cross sectional area of said trap, means for releasably securing said sections together at their adjacent ends, said means comprising an inwardly extending flange and outwardly extending lugs at each of said adjacent ends, a sealing gasket disposed between the flanges and lugs, said lugs and gasket being provided with aligned openings, and fastening means extending through said openings.

References Cited in the file of this patent

UNITED STATES PATENTS

| | | |
|---|---|---|
| 478,808 | Newton | July 12, 1892 |
| 991,123 | Willetts | May 2, 1911 |
| 1,813,178 | Lindsley | July 7, 1931 |
| 1,839,279 | Van Tuyl | Jan. 5, 1932 |

FOREIGN PATENTS

| | | |
|---|---|---|
| 823,482 | France | Oct. 18, 1937 |